Jan. 26, 1965  W. P. WONNEBERGER  3,167,261
COFFEE GRANULIZING APPARATUS
Filed Dec. 4, 1961  3 Sheets-Sheet 1
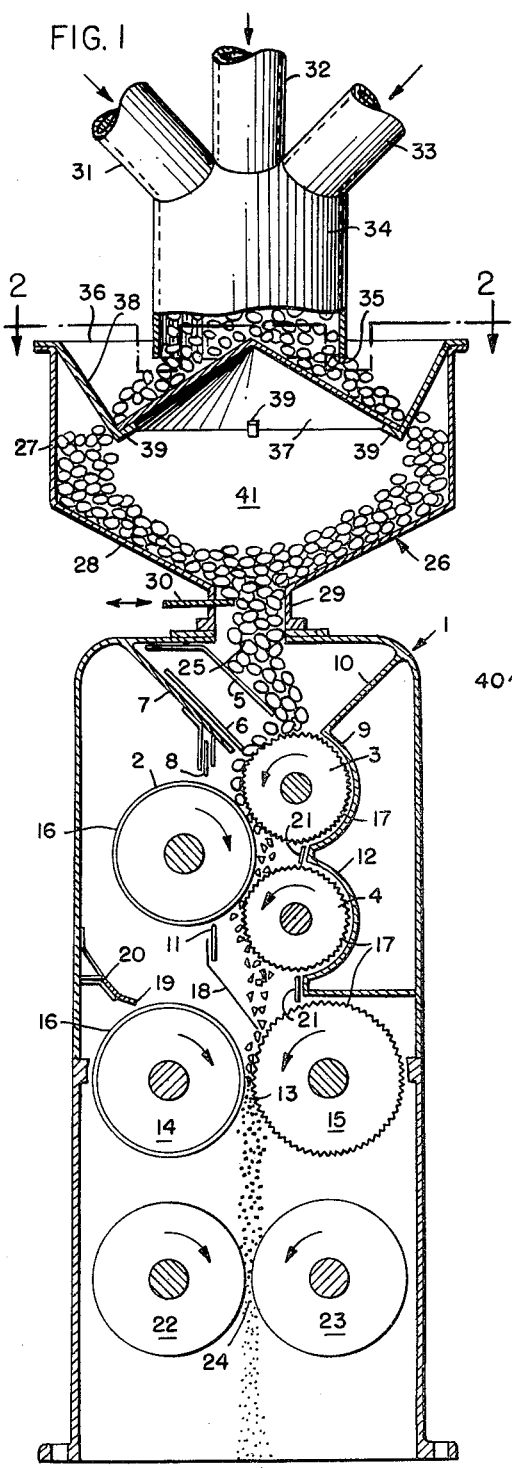
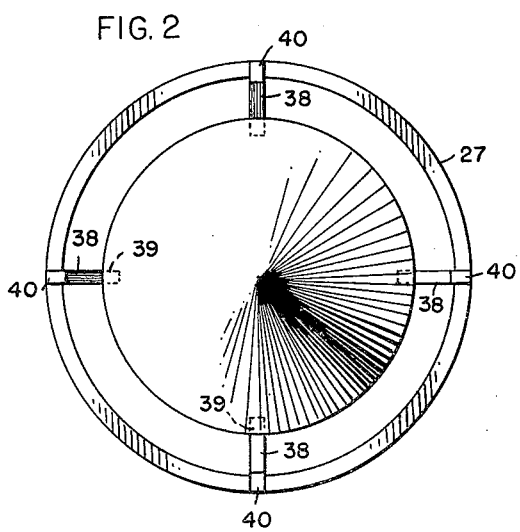
INVENTOR:
WILLIAM P. WONNEBERGER
BY Robert Gottschalk
ATT'Y Jan. 26, 1965 W. P. WONNEBERGER 3,167,261
COFFEE GRANULIZING APPARATUS
Filed Dec. 4, 1961 3 Sheets-Sheet 2
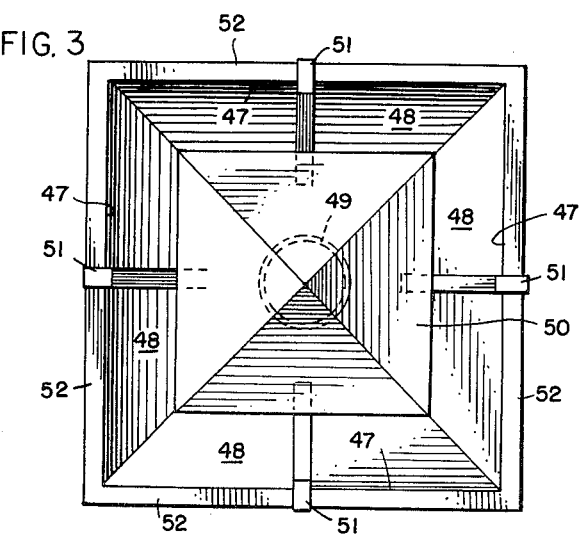
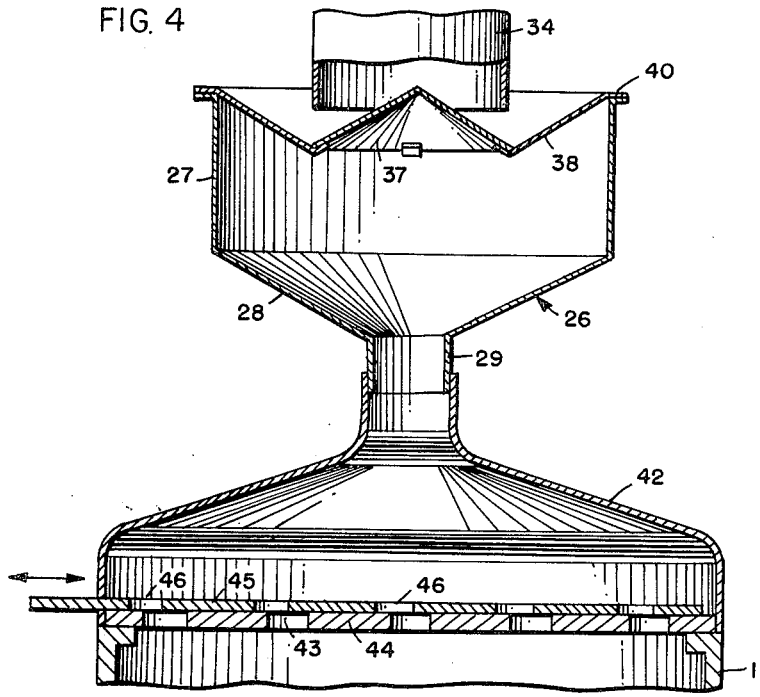
INVENTOR:
WILLIAM P. WONNEBERGER
BY
ATT'Y Jan. 26, 1965  W. P. WONNEBERGER  3,167,261
COFFEE GRANULIZING APPARATUS
Filed Dec. 4, 1961  3 Sheets-Sheet 3
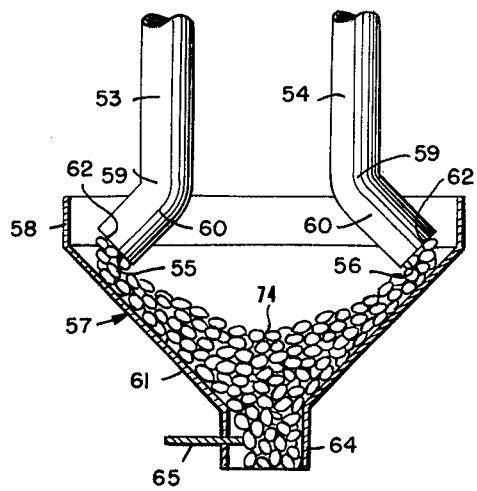
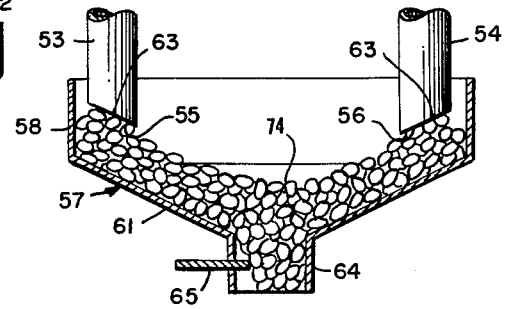
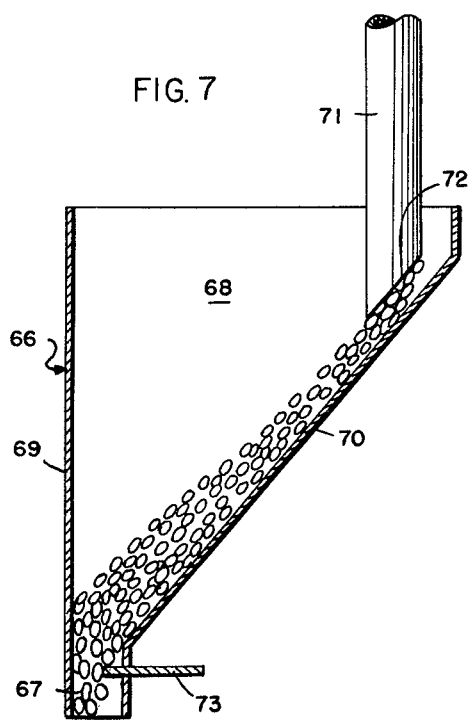
INVENTOR:
WILLIAM P. WONNEBERGER
BY
ATT'Y United States Patent Office 3,167,261
Patented Jan. 26, 1965

3,167,261
COFFEE GRANULIZING APPARATUS
William P. Wonneberger, Glen Ellyn, Ill., assignor to Automatic Canteen Company of America, Chicago, Ill., a corporation of Delaware
Filed Dec. 4, 1961, Ser. No. 156,657
5 Claims. (Cl. 241—159)

This invention, in general, relates to an apparatus for improving the uniformity of flow of coffee beans fed to a coffee granulizer. The improvement of the flow of the coffee beans results in an improved uniform flow rate of coffee into the granulizer, whereby the output of ground coffee from the granulizer may be increased a substantial amount.

It has been the common practice in the coffee granulizing art to feed roasted coffee beans from roasted bean storage bins to a hopper mounted on the granulizer or directly by pipes from the storage bins to a distributing head on the granulizer in the form of an uninterrupted beam mass. I have discovered that the flow of coffee beans under these arrangements is restricted in a manner whereby the feed of the coffee beans from the supply source to the granulizer rolls lacks in uniformity of distribution of the beans along the length of the rolls. Under these conditions, the granulizers have not reached their full potential grinding rate per unit of time. For example, in the usual practices prior to my discovery, roasted coffee beans at the outlet opening of the hopper have been under a static pressure provided by the weight of the head of roasted coffee beans extending from the inlet to the granulizer up to the top of the beans in the roasted bean storage bins. This results in a pressure condition at the inlet zone of the granulizer which restricts steady flow of the coffee beans into the granulizer section of the coffee granulizer.

The principal discovery of this invention is that the weight outputs per unit of time of a given grind of coffee, particularly fine or drip grind coffee or grinds finer than fine or drip grind, are increased to a surprising extent by feeding roasted coffee beans to a granulizer hopper, feed chute, or the like in a manner so that the beans flow through the hopper, feed chute, or the like in a layer of relatively shallow depth. A head pressure as previously described on the area above the beans at the hopper outlet is precluded in the application of the principles of the invention. In the practice of the invention, the downward pressure of the head of the roasted coffee bean supply is directed away from the area immediately above and about the outlet of the hopper, feed chute, or the like. Under these conditions, the bean flow through the hopper is a sloping, gravity flow of coffee beans from the area or areas laterally spaced from the outlet toward the outlet.

One means for attaining the basic objective of the invention lies in the use of a deflector member positioned inside a hopper and directly above the hopper outlet. The function of the deflector member is one of diverting laterally the static head on the coffee beans supplied by gravity flow through a pipe or the like to the hopper against lateral areas of the hopper and providing a sloping, gravity bean flow from the lateral area or areas of the hopper toward the hopper outlet. In this flow pattern, the static head on the beans is directed primarily against the deflector and walls of the hopper, and the static head on the roasted coffee beans at the hopper outlet is only a fraction of the static head which would exist in the absence of the deflector.

In another aspect of the invention, the same type of flow of coffee beans through the hopper, feed chute, or the like is attained by arranging the feed pipes which supply coffee beans by gravity flow from roasted bean storage bins to the hopper, feed chute, or the like in positions whereby the static head of the beans is directed against lateral areas of the hopper, feed chute, or the like and the flow of beans through the latter toward the outlet is that of a relatively shallow layer or depth of coffee beans so that the static head on the roasted coffee beans at the hopper outlet is only a fraction of the static head which would otherwise result.

It is, therefore, a primary object of this invention to provide an apparatus for improving the flow of coffee beans through a coffee supply hopper.

Still another object of the invention is to provide improvements in coffee bean supply means for coffee granulizers.

Still another object of the invention is to provide means for uniformly supplying roasted coffee beans to the granulizing rolls of coffee granulizers to improve the rate of granulizing of coffee beans per unit of time.

Another object is to provide coffee bean feeding improvements for granulizers which result in longer working life for granulizer rolls.

A further object of the invention is to provide means to govern the flow path of roasted coffee beans in a coffee supply hopper or the like so as to decrease the bean flow restriction at the discharge outlet.

Other and further objects of the invention will be apparent from the following description and claims together with the accompanying drawing, which, by way of illustration, shows preferred embodiments of the invention and the principles thereof in what is now considered to be the best modes contemplated for applying these principles. Other embodiments of the invention using the same or equivalent principles may be used and structural changes may be made as desired by those skilled in the art without departing from the true spirit and principles of the invention.

In the drawings:

FIG. 1 is a diagrammatic side elevation in cross-section of a coffee granulizer and one embodiment of the invention for supplying roasted coffee beans to said granulizer;

FIG. 2 is a top plan view of the coffee bean supply hopper shown in FIG. 1 taken along line 2—2 and with the coffee beans removed;

FIG. 3 is a top plan view of a square hopper with a pyramidal deflector member;

FIG. 4 is a cross-sectional view in side elevation of a coffee bean supply hopper mounted on a coffee granulizer having a distributing head;

FIGS. 5 and 6 are side views in diametric cross-section of a hopper and feed pipes therefor showing additional embodiments of the invention;

FIG. 7 is a side view in cross-section of a hopper and a feed pipe therefor as another embodiment of the invention.

It has heretofore been the practice in the granulizing of coffee beans to use a supply system having a bean supply capacity in excess of the normal supply requirements of the granulizer. This has been done by using a small supply hopper on the granulizer, which hopper is fed with roasted beans by one or more pipes connected with roasted bean storage bins at a rate to keep the hopper substantially filled with coffee beans, or has been done by feeding the roasted beans from the roasted bean storage bins directly to the granulizer via a pipe.

The supply of roasted coffee beans to the hopper heretofore employed is one of feeding in an uninterrupted column the coffee beans from roasted coffee bean supply bins into the radially central area of the hopper. In this feed arrangement, the outlet of the bean supply pipe or pipes are slightly below the upper edge of the hopper, and coffee beans flow into the hopper when the level of beans in the hopper drops below the lower end of the pipe(s). The flow stops when the bean level in the hopper is at or slightly above the lower end of the pipe(s). The discharge of beans to the hoppers has been done in a manner such that the static head of the coffee beans in the whole supply system was applied directly on the beans at the outlet opening of the hopper and restricted their uniform flow through said opening.

This invention is based upon my discovery that certain coffee bean flow patterns through a supply hopper, feed chute, or the like, in which patterns the downward flow of coffee beans is a sloping, gravity flow from a lateral area or areas of the hopper, feed chute, or the like toward the outlet opening, relieve the pressure at the outlet opening and result in significant improvements in the uniformity of flow of beans through the outlet. By maintaining the bean flow pattern in accordance with the invention, the pressure build-up due to the static head of the coffee beans above the outlet opening is changed, and the flow of coffee beans through the outlet is of greater uniformity. This uniformity of flow of coffee beans through the hopper, chute, etc., in turn, has beneficial effects upon the rate of granulization of coffee in coffee granulizers, especially where the granulizer rolls are set to produce fine or drip grind or even finer grinds of coffee.

Referring first to FIGS. 1 and 2, there is shown in diagrammatic illustration a coffee granulizer 1 containing a plurality of coffee granulizing rolls. The rolls are rotatably driven in the direction indicated by the arrows appearing thereon. The granulizer roll 2 works in cooperation with granulizing rolls 3 and 4 to provide two stages of granulization. The coffee beans are fed from a feed hopper 26 onto the baffle plate 5. The beans are carried by the granulizer roll 3 against the distributor plate 6 which is supported inside the granulizer on the frame plate 7. The beans are carried under the lower edge of the plate 6 and roll 3 into the first reduction stage provided by the small clearance between the granulizer rolls 2 and 3. The deflector plate 8 prevents the beans from by-passing the first reduction stage behind the roll 2. The curved face 9 of the deflector member 10 precludes the coffee beans from by-passing the first reduction stage behind the roll 3.

The second reduction stage of the coffee granulizer is in the clearance between the rolls 2 and 4. The by-passing of the second reduction stage behind the roll 4 is precluded by the arcuate face 12 of the deflection member 10 while plate 11 performs a deflecting function adjacent the bottom of roll 2.

In the embodiment illustrated, wherein the granulizer roll 2 cooperates with granulizer rolls 3 and 4 to provide two reduction stages, the rolls 3 and 4 operate at a faster peripheral velocity than the peripheral velocity of the granulizer roll 2. The granulizer rolls 2, 3 and 4 may have corrugations in which the slower moving roll 2 has circumferential ring or helical U-shaped grooves with sharp ridges. The faster moving rolls 3 and 4 have slanting, U-shaped corrugations with sharp ridges running lengthwise on the roller surfaces. The details of the granulizer rolls are not shown, however, in order to facilitate the understanding of the invention. The primary granulizing action of these rolls is one of cutting by the sharp ridges rather than crushing. Other granulizing roll structures may be used, however, in the practice of the invention. The clearances at the nip of the breaker rolls 2 and 3 and 2 and 4 are usually factory set.

After the granulized coffee is discharged from the second reduction stage in the nip of the granulizing rolls 2 and 4, it drops into the third reduction stage in the nip 13 of the granulizer rolls 14 and 15. The rolls 14 and 15 are rotatably driven in the direction indicated and function to provide the third reduction stage in the granulizing process. The roll 14 has the ring circumferential or helical sharp ridges 16 and operates at a slower peripheral velocity than the peripheral velocity of the roll 15. The roll 15 may have the Le Page patent corrugations with the lengthwise-extending sharp ridges 17.

The granulized coffee dropping from the second reduction stage is deflected by deflector plate 18 against the granulizer roll 15 and carried into the third reduction stage in the nip 13 of the rolls 14 and 15. The by-passing of the third reduction stage behind roll 14 is precluded by the deflector plate 19 mounted on the mounting bracket 20 while the by-passing of this stage behind roller 15 is precluded by the deflector plate 21 mounted on the member 10.

In the granulizer illustrated, the first three reduction stages produce coffee grinds ranging from coarse or regular grind to drip grind, depending upon the spacing of the granulizing rolls. A fourth set of granulizing rolls 22, 23, rotatably driven in the direction indicated by the arrows, provide in their nip 24 a fourth reduction stage for producing fine or drip grind or grinds even finer than fine grind, depending upon the setting of the spacing of the fine grind rolls 22, 23. These fine grind rolls may be equipped with special saw tooth cutters designed for fine grinding of the granulized coffee fed thereto from the third reduction stage but these are not shown for the sake of convenience.

There is mounted at the coffee bean inlet 25 of the granulizer the granulizer feed hopper 26. The hopper illustrated is a round hopper having a cylindrical side wall 27 and a frusto-conical bottom wall 28 containing at its apex the cylindrical outlet 29 of the hopper which communicates with the coffee bean inlet 25 of the granulizer 1. Other hopper shapes such as oval, square or rectangular may be used with equal facility in the practice of the invention.

The rate of bean discharge from the hopper 26 into the granulizer 1 is controlled by a feed control member mounted in the cylindrical outlet 29. The feed control member illustrated is a slide gate valve 30 which is slidable transversely in the outlet 29 to restrict or enlarge the opening for coffee bean flow.

Roasted coffee beans may be supplied to the granulizer feed hopper 26 by, for example, feed pipes 31, 32 and 33, which feed pipes come from respective roasted coffee supply bins. The pipes 31, 32 and 33 open into a manifold 34 which has its lower edge 35 located slightly below the upper edge 36 of the granulizer feed hopper 26. While the granulizer is operating, the pipes 31, 32 and 33 and the manifold 34 are constantly filled with coffee beans. These beans continuously flow into the hopper 26 until the upper level of beans in the hopper is even with or slightly above the lower edge 35 of the manifold 34, at which stage the bean flow stops until the level of coffee beans in the hopper drops below the edge 35.

One means for achieving the improvements of the invention is to utilize a deflector member positioned near the top of the hopper 26 in the area opposite the outlet 29 of the hopper. One type of deflector member is shown in FIGS. 1, 2 and 4. The deflector member in the illustrated case comprises a deflector cone 37 which is supported radially centrally in the hopper 27 by metal arms 38 having short, bent segments 39 which are spotwelded to the underside of the deflector cone 37. The arms 38 extend outwardly and upwardly from the lower edge of the deflector cone 37, and their outer ends are bent to lie in a flat plane to provide segments 40 which rest on or may be clamped on the upper edge 36 of the hopper 26.

The function of the deflector cone 37 is one of diverting the downward flow of beans from the manifold 34 to the peripheral areas of the hopper 26. This results in a bean flow pattern substantially as illustrated in FIG. 1 wherein the beans flow in a relatively shallow layer downwardly and convergingly inwardly in the hopper 26. The area immediately beneath the deflector cone 37 is a hollow zone 41 which is void of coffee beans. This bean flow pattern substantially decreases the restriction of flow of beans at the outlet 29 as compared with conditions wherein the beans are discharged immediately above the outlet.

The deflector cone 37 is advantageously used with round hoppers. It is desirable that the deflecting surface of the deflector member have a downward slope so that roasted beans do not sit in exposure to air on the deflector member. Hence, a cone-shaped member or other shape having a downwardly deflecting surface is preferred to a flat deflector member.

The deflector members of the invention, however, are not limited to cone-shaped deflector members. There may be used in place of a cone-shaped deflector member 37, for example, a member having a rounded reflector surface such as a hemisphere or smaller segment of a sphere but these are not expressly illustrated. Furthermore, in hoppers of square cross-section a pyramidal deflector may be used. With hoppers that are oblong in cross-section, the deflector member may be in the shape of a hip roof.

A hopper of square cross-section is illustrated in FIG. 3. This hopper has four vertical side walls 47 and four substantially trapezoidal bottom walls 48 sloping toward the hopper outlet pipe 49. A pyramidal deflector 50 is positioned above the outlet pipe 49 adjacent to the upper edge of the hopper in a manner analogous to the positioning of the cone deflector 37 in the hopper of FIGS. 1 and 2. The deflector 50 is supported on the hopper by arms 51 of the same structure as the arms 38 of the cone deflector 37. The ends of the arms 51 rest on the peripheral flange 52 of the hopper of FIG. 3.

Coffee beans are supplied to the hopper of FIG. 3 in a manner similar to that of the embodiment of FIGS. 1 and 2. The beans are deflected outwardly by the downwardly sloping, triangular sides of the pyramidal deflector 50 and fall into the hopper in the spaces between the outer edges of the deflector 50 and the side walls 47. The flow pattern of the beans through the hopper of FIG. 3 is similar to the flow pattern described for the embodiment of FIGS. 1 and 2.

In all cases, it is necessary that the deflector member be positioned above the outlet opening of the hopper. In most instances, it is desirable that the outer edge of the deflector member be spaced at a uniform distance from the side walls of the hopper. Spacing of this type is shown in FIGS. 2 and 3.

The embodiment of FIG. 4 illustrates another embodiment of means for feeding coffee to a granulizer having relatively wide granulizer rolls. The advantages of the invention are also realized in this type of roasted bean feed. In the embodiment, coffee beans are fed by the manifold 34 (or one or more pipes) into a hopper 26 containing a deflector cone 37 in the manner previously described. The beans discharged from the hopper outlet 29, instead of falling directly into the granulizer section of the coffee granulizer as shown in the embodiment of FIGS. 1 and 2, are discharged into an outwardly flaring distributor head 42. The head 42 substantially fills with the roasted coffee beans and the beans are discharged through ports 43 in the lower plate 44 of the distributor head, which, in turn, is mounted on the granulizer 1. The distributor head 42 contains a plate valve 45 having outlet ports 46. By sliding the plate valve 45, the ports 46 are brought into alignment with ports 43, the rate of bean discharge being regulated by the relative positioning of the respective ports. Other embodiments of hoppers, chutes, and the like heretofore and hereinafter described can be used with substantially equivalent results with the granulizer of FIG. 4.

It is possible to attain the advantages of the invention without the use of a centrally disposed deflector member in the hopper of the coffee granulizer if the pipe or pipes which convey the roasted coffee beans from the bean storage bins to the hopper are positioned so that their outlet ends are slightly above the sloping wall of the hopper and are adjacent the side walls of the hopper. Illustrations of such arrangements are shown in FIGS. 5 and 6 wherein two coffee bean feed pipes 53 and 54 have their respective discharge ends 55 and 56 adjacent diametrically opposite sides of the cylindrical wall 58 of the shallow hoppers 57.

In the embodiment of FIG. 5, the pipes 53 and 54 have elbow bends 59 so that the terminal sections 60 of the pipes 53 and 54 are directed outwardly and downwardly toward the sloping wall 61 of the hopper 57. The terminal edge 62 of the sections 60 is preferably, though not absolutely essentially, parallel to or at least nearly parallel to the angle of slope of the hopper wall 61 for optimum control of feed of beans to the hopper.

In the embodiment of FIG. 6, the terminal edges 63 of the feed pipes 53 and 54 are but at an angle so that the terminal edges 63 are parallel to or nearly parallel to the angle of slope of the bottom wall 61.

The rate of discharge of beans through the outlets 64 of hoppers 57 is controlled by the slidable plate valves 65 mounted therein. The beans are continuously supplied through pipes 53 and 54 until the flow is stopped automatically when the bean depth in the hopper rises above the discharge ends 55, 56 of the pipes. Flow of beans to the hopper automatically resumes when the bean depth in the hopper around the pipes falls below the discharge ends 55, 56.

The flow pattern of beans in the hoppers of FIGS. 5 and 6 is essentially one of downward and inward flow of a relatively shallow depth of beans toward the hopper outlet. This flow pattern, similar to the flow patterns achieved with the hopper-deflector combinations previously described, results in a relatively unrestricted flow of beans through the hopper outlet. Similar and equivalent coffee bean flow in the hoppers can be achieved by using more or less than two supply pipes positioned in similar relation to the hopper walls as are the pipes 53 and 54 in the embodiments of FIGS. 5 and 6.

A further embodiment of the invention is illustrated in FIG. 7 wherein the hopper is of still a different shape. This hopper 66 has, instead of the radially centrally positioned hopper outlets of the previously described embodiments, a discharge outlet 67 situated at one side of the hopper. The hopper 66 comprises side walls 68, a vertical end wall 69, and a downwardly sloping end wall 70. A coffee bean supply pipe with a discharge end 72 cut in a plane parallel to or at least nearly parallel to the sloping wall 70 extends into the hopper 66 with its discharge end 72 in proximity to but spaced from the sloping wall 70.

The bean flow pattern in the hopper of FIG. 7 is essentially as illustrated. The beans flow downwardly along wall 70 in a relatively shallow layer toward the outlet 67. The rate of discharge through the outlet is controlled by plate valve 73.

It is within the scope of this invention to substitute for the hopper equivalent apparatus which will give similar or equivalent results in the feed of coffee beans to granulizers.

With feed pipe arrangements of the type shown in FIGS. 5–7, the flow of the coffee beans is a relatively shallow layer of flowing beans taking a downwardly sloping path toward the outlet. In hoppers with a centrally positioned opening, the flowing beans form a central depression or hollow 74 with its lowest point substantially opposite the outlet of the hopper. The beans in the coffee bean storage bins are in constant communication with the hopper or chute and flow into the hopper or chute when the bean level in the hopper falls below the outlet ends of the feed pipes. Bean flow into the hopper or chute stops when the bean level is at or slightly above the outlet ends of the feed pipe(s). Here, as in the case of the deflector members in the hopper, the static head of the coffee beans in the bean supply system is directed against the side areas of the hopper, thereby relieving the pressure exerted at the area adjacent the outlet.

Accordingly, the basic principle of the invention, which results in significant improvements in the rate of granulization of a given grind of coffee at defined grind specifications, especially fine grind coffee or grinds finer than fine grind, is one of providing a roasted coffee bean flow pattern in which the static head of the beans does not act directly in a flow restricting manner on the beans at the outlet zone.

This flow pattern in the supply means for coffee granulizers improves the uniformity of flow of the roasted beans through the outlet with the result that the granulizer rolls of coffee granulizers are more efficiently used throughout their length during the granulizing operation to thereby significantly increase the rate of granulization of coffee into the desired grind. The advantages of the invention are especially significant in improving the granulizing rate in grinding of fine grind or finer grinds of coffee as will be apparent from the following data. Furthermore, granulizer roll life in terms of weight units of coffee ground will be substantially improved because of the improvements in distribution of beans along the length of the rolls during granulization. This advantage applies to all types of grinds from coarse to fine.

EXAMPLE 1

Six thousand and sixty pounds of cool coffee beans were ground on a 777 E Gump granulizer in which the granulizer hopper with a deflector cone was mounted on the distributor head of the granulizer as shown in FIG. 4. The feed setting on the granulizer was 4½, the upper granulizer roll setting was 4⅛, and the lower fine grind roll setting was 6⅞—the settings providing a granulized drip grind coffee having the desired grind analyses.

The grind and density analyses from the granulizing operation are as follows:

*Table I*

ANALYSES OF SAMPLES FROM GRANULIZER

| Retained on Tyler Sieve | Grind Time, Min. | | | | | |
|---|---|---|---|---|---|---|
| | Start | 30 | 60 | 120 | 180 | 187 |
| 10 and 14 | 3.5 | 3.4 | 3.4 | 3.3 | 3.3 | 3.3 |
| 20 | 32.5 | 32.4 | 32.2 | 32.1 | 32. | 31.8 |
| 28 | 42.8 | 42.9 | 43. | 43.1 | 43.2 | 43.3 |
| Pan | 21.2 | 21.3 | 21.4 | 21.5 | 21.5 | 21.6 |
| Total | 100.0 | 100.0 | 100.0 | 100.0 | 100.0 | 100.0 |
| Density | 80.5 | 80.5 | 80.55 | 80.55 | 80.6 | 80.6 |

*Table II*

ANALYSES OF SAMPLES TAKEN AT WEIGHT INTERVALS

| Retained on Tyler Sieve | Total Pounds Granulized | | | | | | | |
|---|---|---|---|---|---|---|---|---|
| | Start | 500 | 1,000 | 2,000 | 3,000 | 4,000 | 5,000 | 6,060 |
| 10 and 14 | 3.5 | 3.4 | 3.4 | 3.3 | 3.3 | 3.3 | 3.2 | 3.2 |
| 20 | 32.4 | 32.2 | 32.1 | 31.8 | 31.5 | 31.2 | 31.1 | 30.9 |
| 28 | 42.9 | 43.1 | 43.1 | 43.3 | 43.5 | 43.7 | 43.8 | 43.9 |
| Pan | 21.2 | 21.3 | 21.4 | 21.6 | 21.7 | 21.8 | 21.9 | 22.0 |
| Total | 100.0 | 100.0 | 100.0 | 100.0 | 100.0 | 100.0 | 100.0 | 100.0 |
| Density | 80.5 | 80.5 | 80.5 | 80.6 | 80.6 | 80.6 | 80.6 | 80.6 |

The granulized coffee was produced at grind specifications at a rate of 1944 lbs. of drip grind coffee per hour.

EXAMPLE 2

A second granulization of a 6060 lb. batch of cool, roasted coffee beans was done on a 777 E Gump granulizer in which the granulizer hopper had a deflector cone. The feed setting on the granulizer was 4½, the upper granulizer roll setting was 4 and the lower fine grind roll setting was 7. The analyses are as follows:

*Table III*

ANALYSES OF SAMPLES FROM GRANULIZER

| Retained on Tyler Sieve | Grind Time, Min. | | | | | |
|---|---|---|---|---|---|---|
| | Start | 30 | 60 | 120 | 180 | 190 |
| 10 and 14 | 3.7 | 3.7 | 3.6 | 3.5 | 3.5 | 3.4 |
| 20 | 32.7 | 32.5 | 32.4 | 32.3 | 32.1 | 32. |
| 28 | 42.6 | 42.7 | 42.8 | 42.9 | 43. | 43.1 |
| Pan | 21.0 | 21.1 | 21.2 | 21.3 | 21.4 | 21.5 |
| Total | 100.0 | 100.0 | 100.0 | 100.0 | 100.0 | 100.0 |
| Density | 80.6 | 80.6 | 80.6 | 80.65 | 80.7 | 80.7 |

*Table IV*

ANALYSES OF SAMPLES TAKEN AT WEIGHT INTERVALS

| Retained on Tyler Sieve | Total Pounds Granulized | | | | | | | |
|---|---|---|---|---|---|---|---|---|
| | Start | 500 | 1,000 | 2,000 | 3,000 | 4,000 | 5,000 | 6,060 |
| 10 and 14 | 3.7 | 3.7 | 3.7 | 3.6 | 3.5 | 3.4 | 3.4 | 3.3 |
| 20 | 32.6 | 32.5 | 32.4 | 32.1 | 31.9 | 31.7 | 31.4 | 31.2 |
| 28 | 42.7 | 42.7 | 42.8 | 43. | 43.1 | 43.3 | 43.5 | 43.7 |
| Pan | 21.0 | 21.1 | 21.1 | 21.3 | 21.5 | 21.6 | 21.7 | 21.8 |
| Total | 100.0 | 100.0 | 100.0 | 100.0 | 100.0 | 100.0 | 100.0 | 100.0 |
| Density | 80.6 | 80.6 | 80.6 | 80.6 | 80.65 | 80.7 | 80.7 | 80.7 |

The granulized coffee was produced at grind specifications at a rate of 1914 lbs. of drip grind coffee per hour.

By way of comparison, a Gump 777 E granulizer produced drip grind coffee at the same grind specifications at a rate of only about 1500±50 lbs. per hour when the granulizer bean feed hopper did not have a deflector cone and the coffee beans were supplied to the hopper opposite the hopper outlet.

The principles of the invention may be applied to not only coffee beans, but also to other solids which have flow characteristics similar to coffee beans. Further, one having an understanding of the principles of the invention, as explained herein, can apply these principles, without departing from the spirit and scope of the invention, to obtain the advantages of the invention in embodiments other than those herein described and illustrated.

The invention is hereby claimed as follows:

1. A coffee granulizer comprising a coffee granulizing section containing a vertical series of sets of rotatably driven granulizer rolls, coffee bean inlet means at the top of said section, coffee bean supply apparatus mounted on said granulizer, said apparatus having a downwardly sloping surface with a coffee bean outlet at the lower end of said surface, and means for feeding coffee beans to said apparatus by gravity flow of a compact mass of coffee beans directed against an area of said surface, which area is laterally displaced with respect to said outlet in said surface, said feeding means further comprising means spaced from said surface to restrict said flow to a layer of predetermined depth.

2. A coffee granulizer comprising a coffee granulizing section containing a vertical series of sets of rotatably driven granulizer rolls, coffee bean inlet means at the top of said section, a coffee bean supply hopper mounted on the granulizer with the outlet of said hopper communicating with said inlet means, conduit means for feeding coffee beans to said hopper by gravity flow of a compact mass of coffee beans, and deflector means in said hopper directly above said outlet for deflecting coffee beans discharged into said hopper from said conduit means against an area of said hopper displaced laterally from said hopper outlet.

3. A coffee granulizer comprising a coffee granulizing section containing a vertical series of sets of rotatably driven granulizer rolls, coffee bean inlet means at the top of said section, a coffee bean supply hopper mounted on the granulizer with the outlet of said hopper communicating with said inlet means, a conduit above said hopper terminating slightly below the upper edge of the hopper, and a deflector member having a downwardly-sloping deflecting surface spaced immediately below said conduit for deflecting coffee beans into a shallow depth displaced laterally from the outlet of the hopper.

4. A coffee granulizer comprising a coffee granulizing section having a vertical series of sets of rotatably driven granulizer rolls and having an inlet area at the top thereof in communication with said section, a coffee bean supply hopper, an outlet from said hopper disposed in communication with said inlet area, side wall structure on said hopper including a wall displaced laterally and slightly upwardly from said inlet area, a coffee bean feed structure for feeding coffee beans gravitationally to said hopper, means for directing the flow from said feed structure to said hopper wall in a shallow depth layer to limit the flow of beans to said hopper outlet to a constant gravitational flow at low head pressure.

5. A coffee granulizer assembly comprising a coffee granulizing section having a vertical series of sets rotatably driven granulizer rolls and having an inlet area at the top thereof in communication with said section, a coffee bean supply hopper, an outlet from said hopper disposed in communication with said inlet area, side wall structure on said hopper including a wall displaced laterally and slightly upwardly from said inlet area, coffee bean feed structure for feeding coffee beans gravitationally to said hopper, means spaced a distance from said wall for restricting the flow from said structure to a shallow depth layer and for directing said flow onto said wall to limit the flow of beans to said hopper outlet to a constant flow with low pressure head.

References Cited by the Examiner
UNITED STATES PATENTS

| | | | |
|---|---|---|---|
| 467,713 | 1/92 | Allfree | 241—159 |
| 814,114 | 3/06 | Burr | 241—248 |
| 1,099,557 | 6/14 | Lorenz et al. | 241—245 X |
| 1,325,676 | 12/19 | McKelvey | 241—152 X |
| 1,491,217 | 4/24 | Wear | 241—44 |
| 1,560,800 | 11/25 | Hoberecht | 241—225 |
| 1,660,284 | 2/28 | Waters | 222—173 |
| 1,663,173 | 3/28 | Pioda | 241—152 |
| 1,787,785 | 1/31 | Jacobson et al. | 222—173 |
| 1,896,724 | 2/33 | Stein | 241—224 |
| 2,114,110 | 4/38 | Kirkland | 241—13 |
| 2,118,010 | 5/38 | Hazle | 241—13 |
| 2,182,131 | 12/39 | Maede | 241—143 |
| 2,239,952 | 4/41 | Dergance | 241—152 X |
| 2,986,348 | 5/61 | Noll et al. | 241—227 |

FOREIGN PATENTS

| | | | |
|---|---|---|---|
| 813,162 | 5/59 | Great Britain. | |

J. SPENCER OVERHOLSER, *Primary Examiner.*

EVERETTE W. KIRBY, *Examiner.*